(12) United States Patent
Erdman

(10) Patent No.: US 6,454,907 B1
(45) Date of Patent: Sep. 24, 2002

(54) METHOD AND APPARATUS FOR CONCENTRATING SLURRIED SOLIDS

(75) Inventor: Gerald Dean Erdman, Reading, PA (US)

(73) Assignee: Minerals Technologies, Inc., Bethlehem, PA (US)

( * ) Notice: Subject to any disclaimer, the term of this patent is extended or adjusted under 35 U.S.C. 154(b) by 0 days.

(21) Appl. No.: 09/294,161

(22) Filed: Apr. 19, 1999

(51) Int. Cl.[7] .................................................. B01D 3/42
(52) U.S. Cl. ............................ 203/1; 159/44; 159/47.3; 159/901; 159/DIG. 16; 159/DIG. 40; 159/2.1; 202/197; 202/177; 202/205; 203/11; 203/40; 203/94; 203/98; 203/88
(58) Field of Search ................................ 159/47.3, 901, 159/DIG. 16, DIG. 40, 2.1, 44; 203/88, 10, 91, 11, 98, 40, 1, 94; 202/176, 177, 205, 197

(56) References Cited

U.S. PATENT DOCUMENTS

| | | | |
|---|---|---|---|
| 1,516,314 A | * | 11/1924 | Sebald ........................ 159/901 |
| 2,488,598 A | | 11/1949 | Lockman |
| 2,735,787 A | | 2/1956 | Eastman et al. |
| 4,007,094 A | * | 2/1977 | Greenfield et al. .. 159/DIG. 25 |
| 4,208,298 A | * | 6/1980 | Irie et al. .................... 159/47.3 |
| 4,504,355 A | | 3/1985 | Yamazaki et al. |
| 4,530,737 A | | 7/1985 | Ostman |
| 4,687,546 A | | 8/1987 | Willis |
| 4,836,891 A | * | 6/1989 | Files et al. ................... 159/901 |
| 4,981,579 A | * | 1/1991 | Paspek et al. .............. 210/806 |
| 5,036,599 A | | 8/1991 | Thompson |
| 5,116,473 A | * | 5/1992 | Bostjancic .................... 159/42 |
| 5,156,706 A | * | 10/1992 | Sephton ...................... 159/47.1 |
| 5,205,906 A | * | 4/1993 | Grutsch et al. ............. 159/901 |
| 5,209,828 A | | 5/1993 | Chou et al. |
| 5,376,238 A | * | 12/1994 | Zambory ...................... 203/11 |
| 5,474,653 A | * | 12/1995 | Bostjancic ................... 159/901 |
| B14,687,546 A | | 6/1996 | Willis |
| 5,792,313 A | * | 8/1998 | Johansson ................... 159/47.3 |

* cited by examiner

Primary Examiner—Virginia Manoharan
(74) Attorney, Agent, or Firm—Marvin J. Powell

(57) ABSTRACT

Method and apparatus for concentrating slurries by removing liquid in a single effect unit maintained under vacuum to effect low temperature flashing of the liquid. The single effect unit is a single flash column with separate recirculation loops, one to preheat incoming slurry for concentration and a separate loop for withdrawal of concentrated slurry. Vapor from the flash column can be treated to separate liquid from other components in the vapor.

16 Claims, 2 Drawing Sheets

METHOD AND APPARATUS FOR CONCENTRATING SLURRIED SOLIDS

BACKGROUND OF THE INVENTION

The present invention pertains to the concentration of slurried particles, for example, concentrating precipitated calcium carbonate slurry from an intermediate solids level to a higher solids level.

In the processing of many materials the material may be dispersed in a slurry which is then subject to further processing to either concentrate the slurried particles or to recover the slurried particles by such conventional techniques as dewatering, filtration and pressing of the dewatered material. A number of industrial processes have attempted to use vacuum columns or vessels to remove the liquid portion, e.g. water from the solid material.

For example U.S. Pat. No. 4,687,546 discloses a method for concentrating kaolin clay using indirect heat exchange to evaporate water from the partially concentrated clay slurry and then vacuum separation to boil off the water at less than normal water boiling temperatures. Patentees require a filtering step to bring the solids concentration to between 50 and 60% prior to heat exchange and flash separation with a starting material being 15% by weight solids.

Patentees in U.S. Pat. No. 5,036,599, cited as an improvement over the previously referred to patent, include a recirculation loop, however, the product was drawn from the recirculation loop and new material for solids concentration is introduced into the separation vessel prior to heat exchange.

U.S. Pat. No. 4,504,355 discloses and claims a vacuum evaporation system for concentrating acetyl cellouse polymer solutions.

U.S. Pat. No. 4,530,737 discloses and claims a process for concentrating a solution by using indirect heat exchange to concentrate black liquor from a sulphate pulping process.

U.S. Pat. No. 5,209,828 discloses vacuum separation of water and volatile organic compounds from a spent caustic stream in a refinery.

SUMMARY OF THE INVENTION

The present invention pertains to the concentration of slurried particles for example, concentrating precipitated calcium carbonate slurry from an intermediate solids level to higher solids level.

According to the present invention the slurry to be concentrated is introduced into a vessel, e.g. a vacuum flash column, maintained at a pressure of less than 4 psia, the incoming slurry to be concentrated is heated so that the temperature inside the vacuum flash column is maintained at a temperature below 150° F., whereby the water boils off and is removed as steam with other gaseous components. The slurry inside the vacuum flash column is at the concentration desired and is maintained at the concentration by having two recirculating systems that recirculate the slurry. One recirculation system includes means to introduce additional slurry to be concentrated which is subject to external heating in order to maintain the supply temperature. The other recirculation system, at a different location from the first recirculation system, is used for withdrawal of concentrated slurry as product. The method and apparatus of the present invention can be used to raise intermediate solid slurries (e.g. 50 to 60 weight percent) to final solids concentrations of 72 to 76 weight percent or higher with the attendant benefit, and certain possibilities to enhance other properties, such as viscosity and handle ability, when compared to conventional dewatering techniques followed by filtration and press cake dispersion.

Therefore, in one aspect the present invention is a method of concentrating solids in a liquid slurry comprising the steps of: establishing a volume of slurry having a solids concentration lower than a desired higher solids concentration inside a vacuum chamber maintained under a vacuum of less than 4 psia, continuously withdrawing a stream of the slurry from the vacuum chamber and recirculating the stream through a heat exchanger to heat the stream to a temperature sufficient to maintain the temperature of the slurry within the chamber at a minimum temperature less than 150° F.; continuously mixing and/or recirculating the slurry contained in the vacuum chamber until a desired higher solids concentration in the slurry is achieved; continuously adding additional slurry having the lower solids concentration, fed into the recirculating stream prior to the recirculating stream entering the heat exchanger; and continuously withdrawing a product slurry having a higher solids concentration than the lower solids concentration fed to the vacuum chamber.

In another aspect the present invention is a system for concentrating solids in a liquid slurry comprising in combination: a vessel adapted to contain a volume of slurry and be maintained under a vacuum of 4 psia or lower; a first recirculation system adapted to continuously withdraw slurry from the chamber and return the slurry into the chamber; heating means in the first recirculation system to heat the recirculating slurry; means to introduce slurry to be concentrated into the first recirculating means; and a second recirculation system at a location away from the first recirculation system to continuously withdraw and recirculate slurry to the vessel, the second recirculation system including means to withdraw concentrated slurry from the second recirculation system.

DETAILED DESCRIPTION OF THE INVENTION

All previous systems examined preferred to operate at ±4 psia (where water boils at ±150° F.), use steam to generate vacuum and use steam to provide the heat for concentration. The stronger the operating vacuum, the more critical the design becomes with respect to equipment isolation in order to prevent air infiltration, which can negate the strong vacuum and desired result. The need that led to the present invention was to sustain a low operating pressure (±1 psia), where water boils at ±104° F., without using steam as the vacuum generator; to allow the use of readily available, low-grade, process waste heat for concentrating a particular slurry to final solids requirements. Further, lower operating temperatures could potentially produce a better quality high solids product in terms of shelf life and settling stability. This system of the present invention uses a single flash column to achieve the target result in one (1) pass and removes the product stream from an internal recycle loop. This operating mode is very different than a typical, multiple effect evaporator using vapor recompression and other operating schemes to continuously concentrate product to final specifications.

Figure 1:
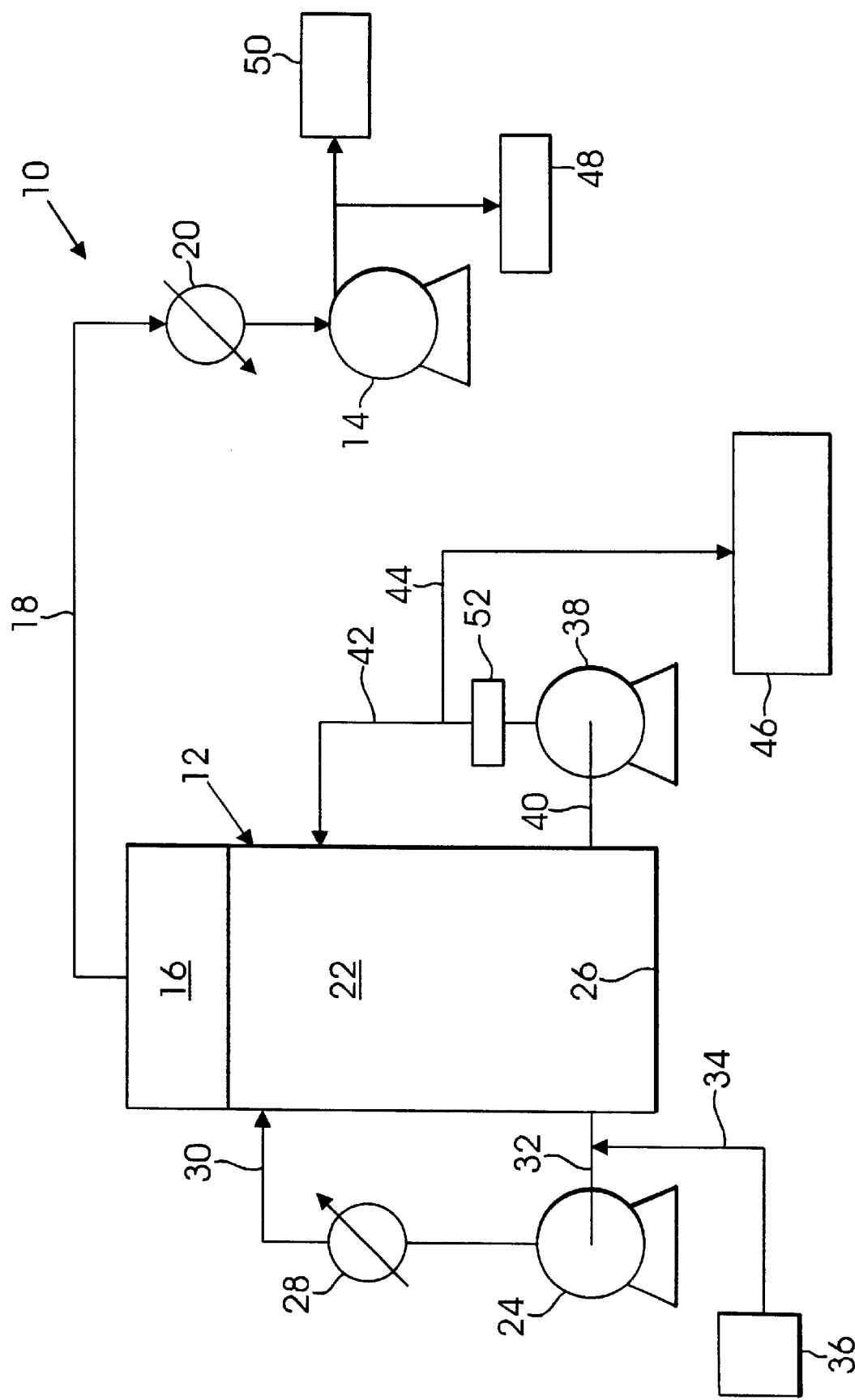
FIG. 1, is a schematic representation of the method and apparatus of the present invention.

FIG. 1 shows in schematic form the apparatus layout and the process scheme according to the present invention. Numeral 10 refers to the overall layout which includes a vacuum vessel or vacuum flash column 12. Vessel or column 12 is preferably oriented vertically and is smaller in diameter than in height. Vacuum flash column 12 is maintained under vacuum by means of a vacuum system (e.g. vacuum pump) 14 which is connected to the overhead space 16 of column 12 via a suitable conduit 18. Disposed between the conduit 18 and the vacuum pump 14 is a heat exchanger 20, the purpose of which will be explained in more detail below. Vacuum flash column 12 is adapted to contain a volume of slurry 22 below the head space 16. A first recirculation pump 24 withdraws slurry from a location near the bottom 26 of vacuum flash column 12 for recirculation through a heat exchanger 28 and back to the column via conduit 30. On the inlet side of pump 24 is a conduit 32 which in turn has an inlet conduit 34 for admission of slurry to be concentrated from a suitable receptacle or vessel shown as 36.

At a location spaced away from pump 24 is a second pump or recirculation device 38 which is used to withdrawal slurry from a location near the bottom 26 of vacuum flash column 12 through a conduit 40 and for reintroduction into the vacuum flash column 12 through an inlet conduit 42. Inlet conduit 42 contains a branch conduit 44 for withdrawal of product which is indicated generally by block 46.

In normal operation of the column 12, overhead is withdrawn via the vacuum pump 14 through conduit 18 and is passed through a heat exchanger 20 for condensing the liquid, e.g. water so that the liquid can be used as a cooling medium for the vacuum pump 14, after which it is removed as a condensate indicated by block 48. At the same time gaseous components remaining in the condensed liquid can be removed in a separator for dispersal or recovery as shown by block 50.

A system according to the invention finds application in concentrating many slurried materials and in particular for raising an intermediate solids slurry of precipitated calcium carbonate containing 50 to 60 weight percent solids to a final product containing solids of between 72 and 76 percent by weight or higher. In order to do this the vacuum flash column 12 is operated under vacuum conditions with a vacuum of approximately 1 psia. The slurry to be concentrated is introduced into the vacuum flash column 12 to the level indicated leaving a head space for withdrawal of vaporized liquids and other gaseous inert products. At a vacuum of approximately 1 psia in the vacuum flash column 12 water contained in the precipitated calcium carbonate slurry will boil at approximately 104° F. This being the case, the slurry recirculating through pump 24 which includes the incoming intermediate solid slurry 34 is heated in heat exchanger 28 to a temperature above 104° F., and preferably about 140° F. Under these conditions the slurry contained in the vacuum flash column 12 is increased from a solids content of between 50 to 60 weight percent to approximately 72 weight percent, a desired concentration. Recirculation pump 38 is used to maintain dynamic conditions in the vacuum flash column 12 and to permit product to be withdrawn from the recirculation line at the full desired concentration.

In certain instances it may be desirable to include a homogenization device shown generally as 52 to maintain certain properties of the concentrated slurry. This is of particular interest when concentrating precipitated calcium carbonate, since the homogenizer serves to maintain the rheological properties of the concentrated product. Heating of the incoming and recirculating slurries in heat exchanger 28 can be accomplished by using hot water which is particularly convenient if there is no steam duty available for this task. On the other side of the process, water vapor and other gases coming from the 18 pass through a heat exchanger 20 so that the water is condensed and the components other than water, e.g. air, carbon dioxide, and other gases, can be separated from the water and the water used to cool the vacuum pump 14.

Figure 2:
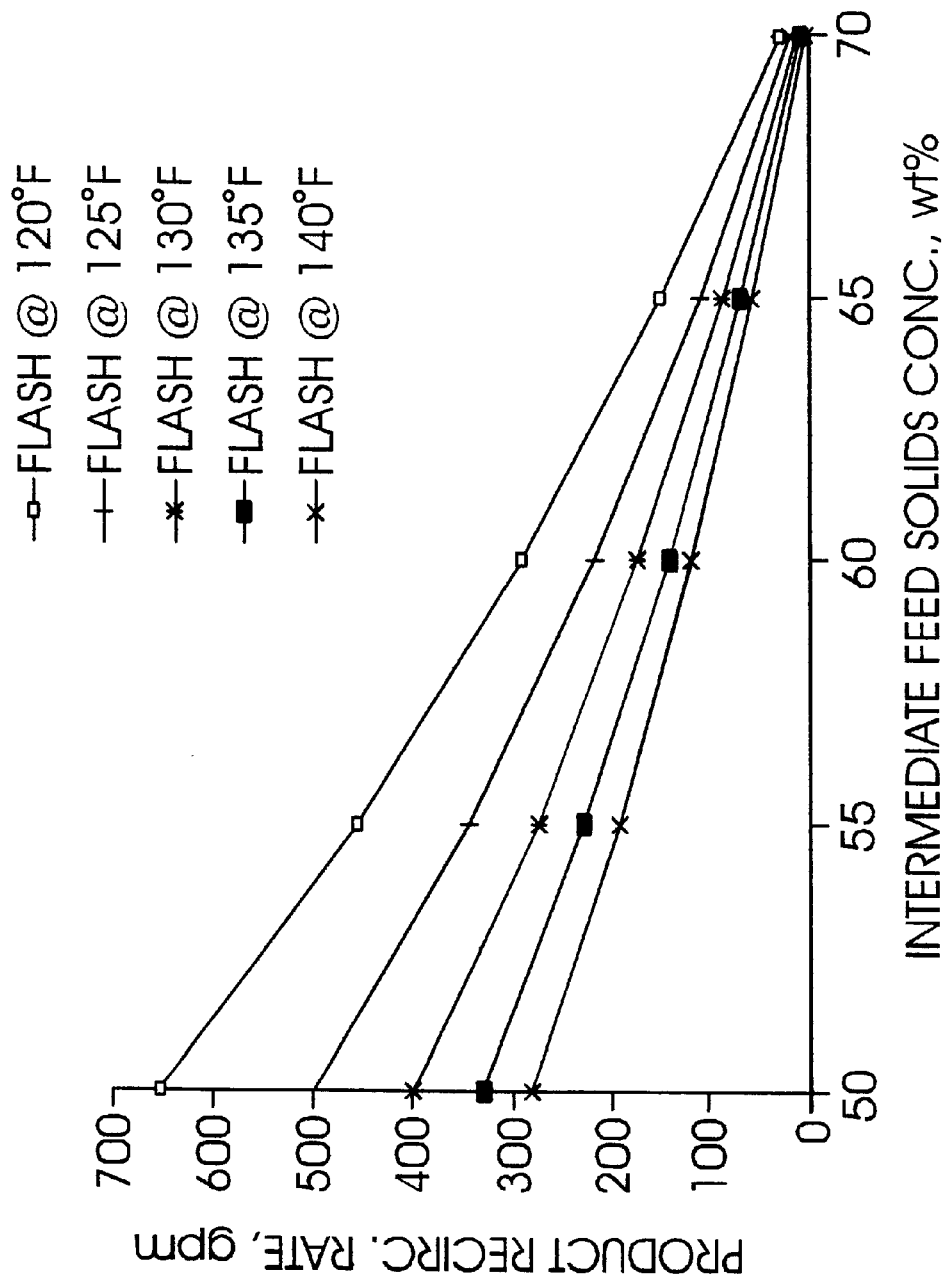
FIG. 2, is a plot of product recirculation rate against intermediate feed solids concentration in weight percent for a precipitated calcium carbonate slurry at various flash temperatures.

Referring to FIG. 2 there is a plot of recirculation rate, in gallons per minute, against intermediate feed solids concentration, in weight percent, for utilizing a system according to the invention to produce approximately 3.5 tons per hour (10.25 gallons per minute) of precipitated calcium carbonate slurry with a solids concentration of approximately 72% by weight, where the flash column feed is heated to temperatures ranging from 120° F. to 140° F. For the plots of FIG. 2, the incoming slurry feed was heated to 140° F., the combined recirculating stream was heated to between 120° F. and 140° F., and the column was maintained under a vacuum so that the water had a nominal boiling point of approximately 104° F. The plots of FIG. 2 define required recirculation rate of 72% slurry as a function of intermediate feed solids concentration and feed pre-heat temperature (prior to return to the column) at an operating rate of 3.5 tons/hr output at 72% solids concentration.

In one case precipitated calcium carbonate slurry was concentrated to almost 76 wt % and then diluted, with "let-back" product quality measurements. The method according to the invention used to produce the 76% product allowed the product to be pumpable and quite handleable (i.e., shear-thinning) after reaching final solids concentration (before dilution), a situation not easily achievable using only mechanical dewatering with subsequent cake dispersion at target final solids.

Thus, according to the present invention, the use of a vertical flash column operated at a pressure of approximately 1 psia, results in a water boiling temperature of approximately 104° F. for a slurry of solids dispersed in water when operating in a continuous mode as described above. The intermediate solids slurry introduced in conduit 34 would contain approximately 50 to 60 weight percent solids. This could be lower or higher. The intermediate solids content slurry is added to a precisely controlled recirculating volume of product solids that becomes blended to some intermediate concentration, the intermediate concentration being a function of final products solids, flash temperature and operating rates, before it gets heated to the targeted inlet temperature at which it enters the flash column 12. The blended intermediate solids stream entering the vacuum flash column 12 flashes to final concentration upon entering the column. Because water vapor liberated during flashing has a very high specific volume under the targeted operating conditions, it may have to be liquefied before entering the vacuum system 14 which maintains the desired operating pressure for the process. The heat exchanger or precondenser 20 is used to liquefy all the condensables which drop into the liquid ring vacuum pump for removal and recycled to a cooling tower. The liquid ring vacuum pump is designed to handle the systems non-condensable components, (e.g. air, $CO_2$, etc.) and minor leakage through conventional connections and fittings.

The present invention provides a solution for those operations not having steam readily available for process heating, as well as high pressure stream to generate a strong vacuum, by applying a significantly stronger than conventionally used vacuum (1 psia as opposed 4 psia or greater) using mechanical means in order to take advantage of readily available low-grade heat from a process such as the manufacture of precipitated calcium carbonate. This permits waste heat from gas scrubbing as well as heat from the heat of reaction to be captured and used to provide the energy to evaporate an intermediate solid slurry to a target final solid slurry specification of, e.g. 72 weight percent, or higher solids concentration. Conventional evaporators are generally of a low height (short) to reduce overall capital cost, thus whenever a strong vacuum is applied to the evaporator a potential leakage problem occurs leading to deterioration of the evaporator performance. In accord with the invention, utilizing a strong vacuum with a tall slender column will effectively prevent all auxiliary equipment, (such as pumps, heat exchanges and the like) from leaking air into the process in the event of seal failure. A tall thin evaporator design can also effectively isolate the stronger vacuum in the column, its interconnecting piping and the water vapor side of the process. This permits a rapid isolation resolution of any leakage problem, should one develop. With a short column a leaking heat exchanger pump could negate all the potential process operating benefits of a strong vacuum.

The vacuum flash column (VFC) is a low temperature evaporation step, where the slurry of precipated calcium carbonate can be concentrated from an intermediate solids (e.g. ±50%) to target final solids of 72%, minimum. The column operates at a nominal 1 psia, where water boils at approximately 104° F., which enables this step to utilize low-grade, waste heat available directly from the process used to produce the precipitated calcium carbonate or other site-specific opportunities. Operating pressure is maintained by a mechanical, liquid ring vacuum pump. Depending upon the size of the vacuum source a precondenser may be required. Cooling tower water is used for condensing and the flowrate will vary (significantly) with seasonal conditions, where summer-time temperatures (design basis) dictate the highest flowrate. Intermediate solids product is concentrated to final specifications in a single pass and flow control is a key parameter. It is necessary to blend the incoming feed with sufficient, recirculating 72% product in order to guarantee that 72% solids is achieved on flashing; and the recirculating product load is a function of incoming fresh feed & temperature, along with the blended feed temperature fed to the flash column's inlet. An experimental design assumed fresh feed arrives at 55% solids at 140° F. and that a blended (recirculating plus fresh) feed temperature of 120° F. is delivered to the vacuum flash column inlet. Product recirculation rate and evaporative load (Btu/hr) increases with lower feed solids or higher production at standard solids. In the experimental design, evaporation load is was about 3600 lb-water/hr.

The process of the present invention has flexible operating temperatures bounded only by cooling water supply and maximum achievable and sustainable vacuum. For example, the pilot prototype has successfully operated with a boiling point as low as 94° F. (0.8 psia); this means that process cooling water must be at least 15° F. below that point in order to condense the boiling vapor—in winter time that may not be a problem; during summer time conditions, cooling tower water could potentially have operating temperatures well above that limit and both the sustainable vacuum and boiling point will be higher as a direct result. It's estimated that the sustainable lower limit of the liquid ring vacuum pump will be 0.5 psia, where water boils at 80° F., but (depending on available utilities) it may not be practical to operate under those conditions. The upper flashing (boiling) limit for this approach (utilizing process waste heat) is about 140° F. At these conditions, the operating pressure is about 3 psia and the ability to capture a significant amount of process waste heat is severely diminished. The process could operate at higher pressure than 3 psia, where the boiling point rises to 150° F. or higher, but this puts a demand for higher temperature waste heat or steam sources which may not be a readily-available or low cost.

The method and apparatus of the present invention have many uses. For example, a high solids product can be produced by concentrating intermediate solids slurries which have been produced by low cost dewatering devices such as rotary vacuum filters, gravity settling tables, or low solids centrifugal settlers, and the like.

The method and apparatus of the present invention can be used to lower the normal boiling or flashing temperature for flashing a solvent or diluent (other than water) or portions thereof from a slurry suspension to concentrate the solids.

The method and apparatus of the present invention enable a user to manufacture a stable, high solids product which is higher than that achievable by current production methods in certain applications.

The method and apparatus of the present invention enable a user to increase the capacity of existing high solids processes by enabling current dewatering devices to operate at higher capacity and lower solids followed by concentration to a final targets solids using the invention.

It is also possible with the method and apparatus of the present invention to, in certain applications, generate higher intermediate solids slurries for a particular customer to reduce freight, improve overall product quality and give the customer advantage of a higher solids feedstock.

Having thus described my invention what is desired to be secured by Letters Patents of the United States is set forth, without limitation, in the appended claims.

What is claimed:

1. A method of concentrating solids in a water slurry comprising the steps of:

establishing a volume of slurry having a first solids concentration inside a vacuum chamber maintained under a vacuum of about 1 psia to about 4 psia, continuously withdrawing a stream of said slurry through a first recirculation system and recirculating said stream through a heat exchanger to heat said stream to a temperature sufficient to maintain the temperature of said slurry within said chamber at a temperature of at least 150° F.;

continuously mixing said slurry contained in said vacuum chamber until a desired higher concentration in said slurry is achieved;

continuously adding additional slurry having said first solids concentration into said recirculating stream prior to said recirculating stream entering said heat exchanger;

continuously withdrawing a product slurry having a second solids concentration from a second recirculation system at a location away from the first recirculation system and maintaining the rheological properties of the product slurry.

2. A method according to claim 1 including the step of withdrawing an overhead stream of water vapor and gases from the group consisting of air and carbon dioxide, from said vacuum chamber.

3. A method according to claim 2 including the step of separating said gases from said overhead stream and condensing said water vapor.

4. A method according to claim 1 including using a mixing pump to recirculate said slurry, said mixing pump disposed outside of said vacuum chamber so that said product slurry can be withdrawn on a discharge side of said pump.

5. A method according to claim 4 including the step of inserting a homogenizer between said discharge of said pump and a location in a recirculation conduit where said product slurry is removed.

6. A means according to claim 1 including using a circulation pump to withdraw said slurry from said vacuum chamber and introduce said withdrawn slurry to said heat exchanger.

7. A method according to claim 1 including maintaining said vacuum chamber under a vacuum of about 1 psia.

8. A system for concentrating solids in a liquid slurry comprising in combination:
   a vessel containing a volume of slurry and maintained under a vacuum of about 1 psia to about 4 psia;
   a first recirculation system for continuously withdrawing slurry from said vessel and seized said slurry into said chamber;
   heating means in said first recirculation system for heating said recirculating slurry;
   a means for introducing additional slurry to be concentrated into said first recirculating means;
   a second recirculation system at a location away from said first recirculation system to continuously withdraw and recirculate slurry to said vessel said second recirculation system including means for withdrawing concentrated slurry from said second recirculation system; and
   a means for improving slurry rheology upstream of said means used for withdrawing said slurry having a higher solids concentration from said second recirculation system.

9. A system according to claim 8 including a homogenizer upstream of a conduit used to withdraw said slurry having a second solids concentration from said second recirculation system.

10. A method of concentrating solids in a water slurry comprising the steps of:
    establishing a volume of slurry having a first solid concentration inside a vacuum chamber maintained under a vacuum of about 1 psia,
    continuously withdrawing a stream of said slurry through a first recirculation system and recirculating said stream through a heat exchanger to heat said stream to a temperature sufficient to maintain the temperature of said slurry within said chamber at a temperature of at least 104° F.;
    continuously mixing said slurry contained in said vacuum chamber until a second higher solids concentration in said slurry is achieved;
    continuously adding additional slurry having said first solids concentration into said recirculating stream prior to said recirculating stream entering said heat exchanger;
    continuously withdrawing a product slurry having said second solids concentration from a second recirculation system at a location away from the first recirculation system and maintaining the rheological properties of the product slurry.

11. A method according to claim 10 including the step of withdrawing an overhead stream of water vapor and gases from the group consisting of air and carbon dioxide from said vacuum chamber.

12. A method according to claim 11 including the step of separating said gases from said overhead stream and condensing said water vapor.

13. A means according to claim 10 including using a mixing pump to recirculate said slurry said mixing pump disposed outside of said vacuum chamber so that said product can be withdrawn on a discharge side of said pump.

14. A means according to claim 13 including the step of inserting a homogenizer between said discharge of said pump and a location in a recirculation conduit where said product is removed from said slurry.

15. A means according to claim 10 including using a circulation pump to withdraw said slurry from said vacuum chamber and introduce said withdraw slurry to said heat exchanger.

16. A method according to claim 10 including maintaining said vacuum chamber under a vacuum of about 1 psia using a liquid ring pump.

* * * * *